United States Patent
Li

(10) Patent No.: US 12,439,284 B2
(45) Date of Patent: Oct. 7, 2025

(54) METHOD AND DEVICE FOR MEASURING CHANNEL STATE INFORMATION

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 368 days.

(21) Appl. No.: 17/911,964

(22) PCT Filed: Mar. 17, 2020

(86) PCT No.: PCT/CN2020/079778
§ 371 (c)(1),
(2) Date: Sep. 15, 2022

(87) PCT Pub. No.: WO2021/184217
PCT Pub. Date: Sep. 23, 2021

(65) Prior Publication Data
US 2023/0189026 A1    Jun. 15, 2023

(51) Int. Cl.
*H04W 24/08*   (2009.01)
(52) U.S. Cl.
CPC ................. *H04W 24/08* (2013.01)
(58) Field of Classification Search
None
See application file for complete search history.

(56) References Cited

U.S. PATENT DOCUMENTS

| | | | |
|---|---|---|---|
| 9,264,961 B1* | 2/2016 | Shah | H04W 36/00835 |
| 10,142,949 B2* | 11/2018 | Imamura | H04W 24/02 |
| 2015/0146561 A1* | 5/2015 | Jung | H04B 7/024 370/252 |
| 2016/0037425 A1* | 2/2016 | Van Lieshout | H04B 7/024 370/332 |
| 2016/0337930 A1* | 11/2016 | Agarwal | H04W 28/0958 |
| 2017/0265111 A1* | 9/2017 | Fan | H04B 7/0617 |
| 2018/0279145 A1* | 9/2018 | Jung | H04L 5/0051 |
| 2018/0368034 A1 | 12/2018 | Lin et al. | |
| 2019/0363810 A1 | 11/2019 | Luo et al. | |
| 2020/0145077 A1* | 5/2020 | Sarkis | H04L 1/0026 |

(Continued)

FOREIGN PATENT DOCUMENTS

| | | |
|---|---|---|
| CN | 106488472 A | 3/2017 |
| CN | 107734574 A | 2/2018 |

(Continued)

OTHER PUBLICATIONS

PCT/CN2020/079778 International Search Report dated Dec. 17, 2020; 2 pages.

(Continued)

*Primary Examiner* — Clemence S Han
(74) *Attorney, Agent, or Firm* — Cozen O'Connor

(57) ABSTRACT

A method for measuring channel state information is provided, which is applicable to a network device of a serving cell of a UE, includes: transmitting measurement configuration information of a neighbor cell to the UE, in which the measurement configuration information is configured to instruct the UE to measure channel state information between the UE and the neighbor cell based on beam transmission.

19 Claims, 10 Drawing Sheets

(56) References Cited

U.S. PATENT DOCUMENTS

2020/0244392 A1* 7/2020 Noh ................. H04L 1/0026
2021/0160028 A1* 5/2021 Park ................. H04L 5/0048

FOREIGN PATENT DOCUMENTS

| CN | 108377558 A | 8/2018 |
| CN | 110431797 A | 11/2019 |
| WO | WO 2013166709 A1 | 11/2013 |

OTHER PUBLICATIONS

European Patent Application No. 20925490.3, Search and Opinion dated Nov. 29, 2023, 14 pages.
Chinese Patent Application No. 202080000561.5, First Office Action dated Oct. 19, 2022, 12 pages.
Chinese Patent Application No. 202080000561.5, English translation of First Office Action dated Oct. 19, 2022, 16 pages.
Chinese Patent Application No. 202080000561.5, Second Office Action dated Apr. 17, 2023, 11 pages.
Chinese Patent Application No. 202080000561.5, English translation of Second Office Action dated Apr. 17, 2023, 15 pages.

* cited by examiner

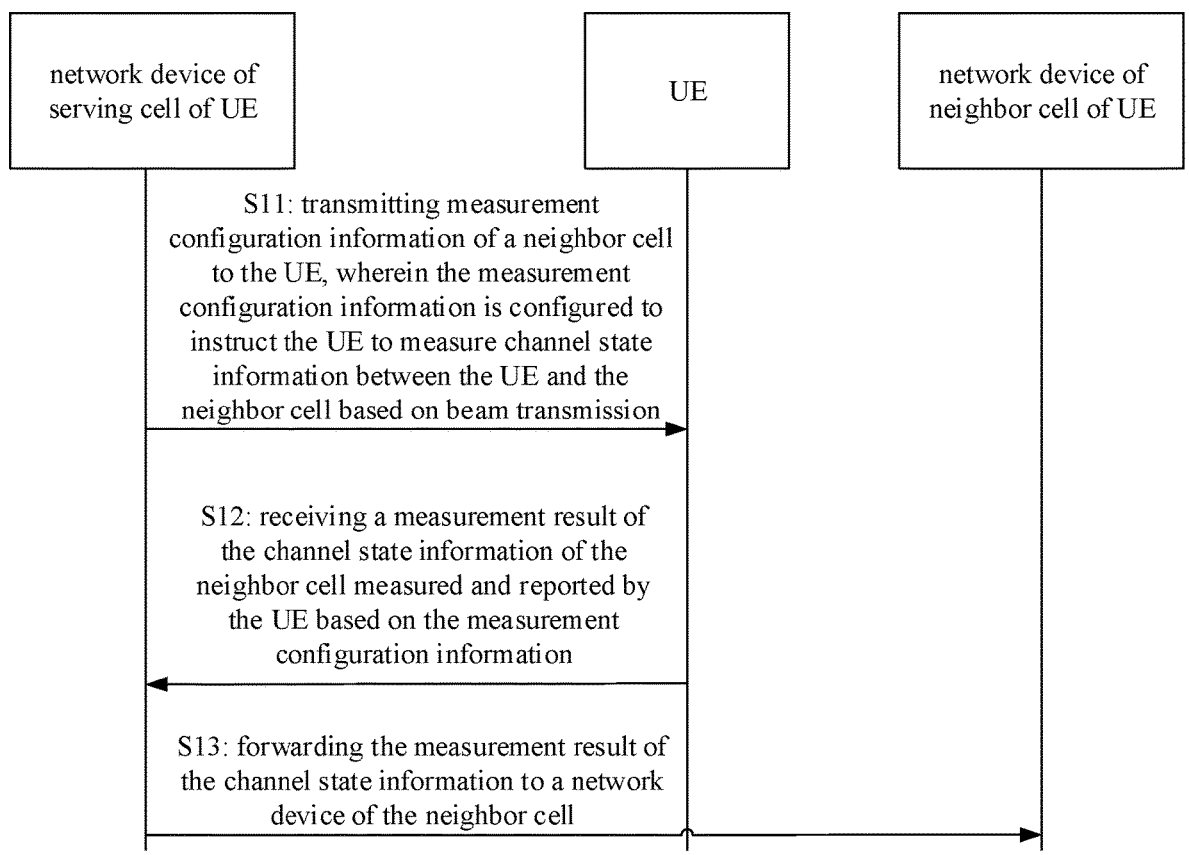

METHOD AND DEVICE FOR MEASURING CHANNEL STATE INFORMATION

CROSS-REFERENCE TO RELATED APPLICATION

This application is the national phase of International Application No. PCT/CN2020/079778, filed on Mar. 17, 2020, the content of which is hereby incorporated by reference in its entirety into this disclosure.

TECHNICAL FIELD

The disclosure relates to communication technologies, and in particular to, a method and a device for measuring channel state information, and a computer storage medium.

BACKGROUND

In the new radio (NR) system of the 5th generation (5G) mobile network or 5G wireless system, beam-based transmission and reception are required because high frequency channels attenuate faster, so as to guarantee the coverage. This is especially true for communication frequency bands above 6 GHz.

SUMMARY

According to a first aspect of embodiments of the disclosure, a method for measuring channel state information is provided, which is applicable to a network device of a serving cell of a UE. The method includes: transmitting measurement configuration information of a neighbor cell to the UE, in which the measurement configuration information is configured to instruct the UE to measure channel state information between the UE and the neighbor cell based on beam transmission.

According to a second aspect of embodiments of the disclosure, a method for measuring channel state information is provided, which is applicable to a UE. The method includes: receiving measurement configuration information from a network device of a serving cell of the UE, in which the measurement configuration information is configured to instruct the UE to measure channel state information between the UE and a neighbor cell of the UE based on beam transmission; and measuring the channel state information between the UE and the neighbor cell based on the measurement configuration information.

According to a third aspect of embodiments of the disclosure, a method for measuring channel state information is provided, which is applicable to a network device of a serving cell of a UE. The method includes: transmitting measurement request information to a network device of a neighbor cell of the UE, in which the measurement request information is configured to instruct the network device of the neighbor cell to measure channel state information between the UE and the neighbor cell based on beam transmission.

According to a fourth aspect of embodiments of the disclosure, a method for measuring channel state information is provided, which is applicable to a network device of a neighbor cell of a UE. The method includes: receiving measurement request information from a network device of a serving cell of the UE, in which the measurement request information is configured to instruct the network device of the neighbor cell to measure channel state information between the UE and the neighbor cell based on beam transmission; and measuring the channel state information based on the measurement request information.

According to a fifth aspect of embodiments of the disclosure, a method for measuring channel state information is provided, which is applicable to a UE. The method includes: receiving second SRS configuration information from a network device of a serving cell of the UE, in which the second SRS configuration information carries usage indication information of an SRS; and transmitting the SRS based on the second SRS configuration information, in which the SRS is configured for a network device of a neighbor cell of the UE to measure channel state information between the UE and the neighbor cell based on beam transmission.

According to a sixth aspect of embodiments of the disclosure, a device for measuring channel state information is provided, which is applicable to a network device of a serving cell of a UE. The device includes: a processor; and a memory for storing executable instructions; in which, the processor is configured to perform the method for measuring channel state information according to the first aspect of the disclosure when the executable instructions are executed.

According to a seventh aspect of embodiments of the disclosure, a device for measuring channel state information is provided, which is applicable to a UE. The device includes: a processor; and a memory for storing executable instructions; in which, the processor is configured to perform the method for measuring channel state information according to the second aspect of the disclosure when the executable instructions are executed.

According to an eighth twelfth aspect of embodiments of the disclosure, a device for measuring channel state information is provided, which is applicable to a network device of a serving cell of a UE. The device includes: a processor; and a memory for storing executable instructions; in which, the processor is configured to perform the method for measuring channel state information according to the third aspect of the disclosure when the executable instructions are executed.

According to a ninth aspect of embodiments of the disclosure, a device for measuring channel state information is provided, which is applicable to a network device of a neighbor cell of a UE. The device includes: a processor; and a memory for storing executable instructions; in which, the processor is configured to perform the method for measuring channel state information according to the fourth aspect of the disclosure when the executable instructions are executed.

According to a tenth aspect of embodiments of the disclosure, a device for measuring channel state information is provided, which is applicable to a UE. The device includes: a processor; and a memory for storing executable instructions; in which, the processor is configured to perform the method for measuring channel state information according to the fifth aspect of the disclosure when the executable instructions are executed.

According to an eleventh aspect of embodiments of the disclosure, a computer storage medium is provided, which is applicable to a network device of a serving cell of a UE, in which executable instructions are stored in the computer storage medium, and when the executable instructions are executed by a processor, the processor is enabled to perform the method for measuring channel state information according to the first aspect of the disclosure.

According to a twelfth aspect of embodiments of the disclosure, a computer storage medium is provided, which is applicable to a UE, in which executable instructions are stored in the computer storage medium, and when the executable instructions are executed by a processor, the processor is enabled to perform the method for measuring channel state information according to the second aspect of the disclosure.

According to a thirteenth aspect of embodiments of the disclosure, a computer storage medium is provided, which is applicable to a network device of a serving cell of a UE, in which executable instructions are stored in the computer storage medium, and when the executable instructions are executed by a processor, the processor is enabled to perform the method for measuring channel state information according to the third aspect of the disclosure.

According to a fourteenth aspect of embodiments of the disclosure, a computer storage medium is provided, which is applicable to a network device of a neighbor cell of a UE, in which executable instructions are stored in the computer storage medium, and when the executable instructions are executed by a processor, the processor is enabled to perform the method for measuring channel state information according to the fourth aspect of the disclosure.

According to a fifteenth aspect of embodiments of the disclosure, a computer storage medium is provided, which is applicable to a UE, in which executable instructions are stored in the computer storage medium, and when the executable instructions are executed by a processor, the processor is enabled to perform the method for measuring channel state information according to the fifth aspect of the disclosure.

It should be understood that the above general description and the following detailed description are only exemplary and explanatory, and may not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain principles of the disclosure.

FIG. 2 is flowchart of a method for measuring channel state information in a network device of a serving cell of a user equipment, according to some embodiments.

FIG. 3 is flowchart of device interaction according to some embodiments.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the terms "if" and "in case" as used herein can be interpreted as "when", "while" or "in response to determining".

Figure 1:
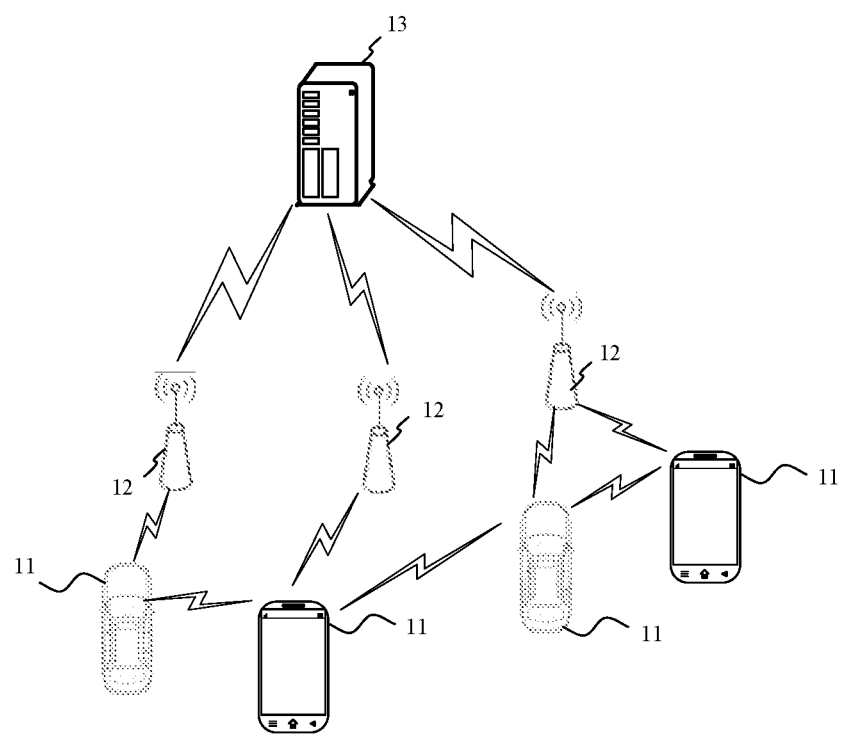
FIG. 1 is a schematic diagram of a wireless communication system according to some embodiments.

FIG. 1 is a schematic diagram of a wireless communication system according to some embodiments. As illustrated in FIG. 1, the wireless communication system is a communication system based on cellular mobile communication technologies, and the wireless communication system may include terminals 11 and base stations 12.

The terminal 11 may be a device that provides voice and/or data connectivity to a user. The terminal 11 may communicate with one or more core networks via a radio access network (RAN). The terminal 11 may be an Internet of Things (IoT) terminal, such as a sensor device, a mobile phone (or "cellular" phone) and a computer with the IoT terminal. The terminal 11 may be a fixed, portable, pocket, hand-held, computer built-in or vehicle-mounted device, for example, a station (STA), a subscriber unit, a subscriber station, a mobile station, a mobile, a remote station, an access point, a remote terminal, an access terminal, a user terminal, a user agent, a user device, or a UE. Alternatively, the terminal 11 may also be a device of an unmanned aerial vehicle. Alternatively, the terminal 11 may also be a vehicle-mounted device, for example, an engine control unit (ECU) with a wireless communication function or a wireless communication device externally connected to the ECU. Alternatively, the terminal 11 may also be a roadside device, for example, a street light, a signal light, or other roadside devices with a wireless communication function.

The base station 12 may be a network-side device in a wireless communication system. The wireless communication system may be the 4th generation (4G) mobile communication system, also known as a long term evolution (LTE) system. Or, the wireless communication system may also be a 5G system, also known as a NR system or 5G NR system. Alternatively, the wireless communication system may also be a next-generation system of the 5G system. The access network in the 5G system may be called new generation-radio access network (NG-RAN), or machine-type communication (MTC) system.

The base station 12 may be an evolved base station (eNB) employed in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with protocol stacks of a packet data convergence protocol (PDCP) layer, a radio link control (RLC) layer, and a media access control (MAC) layer. A protocol stack of a physical (PHY) layer is set in the DU. The specific implementation manner of the base station 12 is not limited in some embodiments of the disclosure.

A wireless connection can be established between the base station 12 and the terminal 11 through a radio air interface. In different embodiments, the radio air interface may be a radio air interface based on the 4G mobile communication network technology standard, or the radio air interface may be a radio air interface based on the 5G mobile communication network technology standard, for example, the radio air interface is a NR, or, the radio air interface may also be a radio air interface based on a next generation of 5G mobile communication network technology standard.

In some embodiments, an end to end (E2E) connection may also be established between the terminals 11, for example, scenes of vehicle to vehicle (V2V) communication, vehicle to infrastructure (V21) communication and vehicle to pedestrian (V2P) communication in vehicle to everything (V2X) communication.

In some embodiments, the above wireless communication system may further include a network management device 13.

Base stations 12 are connected to the network management device 13 respectively. The network management device 13 may be a core network device in the wireless communication system, for example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS). The implementation form of the network management device 13 is not limited in some embodiments of the disclosure.

In the NR system, especially when the communication frequency band is above 6 GHz, due to high frequency channels attenuate faster, beam-based transmission and reception are required to guarantee coverage.

In the related art, when the base station has multiple transmission-reception points (TRPs) and each TRP has one or more panels, or the base station has one TRP and the one TRP has multiple panels, the base station can use multiple panels to transmit data to the same UE simultaneously, and the multiple panels may come from the same TRP or different TRPs. Similarly, when the UE also has multiple panels, the UE can use multiple panels to transmit data to the base station.

In the related art, when the UE moves to an edge of a cell, a reference signal receiving power of a serving cell, which is measured on panel #1, may be the strongest, and a reference signal receiving power of a neighbor cell, which is measured on panel #2, may be the strongest. In this case, if the UE continues to stay in the serving cell or switches to the neighbor cell, the throughput will not be optimal because the UE may be in an overlapping position of coverages of the two cells, channel conditions provided by the serving cell may be the best sometimes, and channel conditions provided by the neighbor cell may be the best at other times. In this case, the optimal manner is that different cells transmit data for the UE based on beams simultaneously, and beam dynamic switching can be realized. In this case, in order to enable the neighbor cell to better serve the UE, it is necessary to obtain channel state information between the UE and the neighbor cell, and there is no manner for measuring channel state information between the UE and the neighbor cell in the related art.

Based on the above wireless communication system, various embodiments of the method of the disclosure are proposed on how to obtain the channel state information between the UE and the neighbor cell.

Embodiments of the disclosure show a method for measuring channel state information. As illustrated in FIG. 2, the method for measuring channel state information is applicable to a network device of a serving cell of a UE, such as a base station of the serving cell of the UE. The method includes the following step.

In S11, measurement configuration information of a neighbor cell is transmitted to the UE, in which the measurement configuration information is configured to instruct the UE to measure channel state information between the UE and the neighbor cell based on beam transmission.

In some embodiments, the measurement configuration information includes one or more of: physical cell identification information of the neighbor cell; frequency domain information of the neighbor cell; or measurement configuration sub-information of the neighbor cell.

The physical cell identification information may include identification information such as a physical cell index (PCI).

The frequency domain information may include a frequency point and a bandwidth located by a carrier or a bandwidth part (BWP).

In some embodiments, the measurement configuration sub-information of the neighbor cell includes one or more of: first resource indication information of a first reference signal for channel state information signal quality measurement; second resource indication information of a second reference signal for CSI-IM; or measurement result report configuration information of the channel state information.

In some embodiments, the first reference signal includes a SSB or a CSI-RS transmitted by a network devices of the neighbor cell.

The CSI-RS includes a non-zero power channel state information-reference signal resource (NZP-CSI-RS) or a zero power channel state information-reference signal resource (ZP-CSI-RS).

In some embodiments, the first resource indication information includes one or more of: an identifier of the first reference signal; time domain location information of the first reference signal; frequency domain location information of the first reference signal; or beam direction information of the first reference signal.

The beam direction of the first reference signal may be indicated by a TCI state or space relation information.

The reference signal indicated by the TCI state or the space relation information is the SSB or CSI-RS transmitted by the network device of the neighbor cell through the neighbor cell, or an SRS transmitted by the UE.

In some embodiments, the second reference signal includes an SSB or a CSI-RS transmitted by the network device of the neighbor cell; and the second resource indication information includes one or more of: an identifier of the second reference signal; time domain location information of the second reference signal; frequency domain location information of the second reference signal; or beam direction information of the second reference signal.

The beam direction of the second reference signal may be indicated by a TCI state or space relation information.

The reference signal indicated by the TCI state or the space relation information is the SSB or CSI-RS transmitted by the network device of the neighbor cell through the neighbor cell, or an SRS transmitted by the UE.

In some embodiments, the measurement result report configuration information includes one or more of: a cell index; a report type; an identifier of a reference signal to be measured; report parameters; report bandwidth configuration information; or a CQI.

The cell index may be a PCI, or a number assigned to this cell, which is configured to distinguish it from one or more other cells that provide transmission services for the UE, for example, there are 3 cells provide services for the UE, the three cell numbers may be #0, #1 and #2 respectively.

The report type is divided into periodic reporting, aperiodic reporting, or semi-persistent reporting.

In some embodiments, periodic reporting needs to give a period and a time slot offset.

In some embodiments, aperiodic reporting needs to provide a time slot offset, for example, a time slot position for reporting the CSI is obtained according to a time slot position of a physical downlink control channel (PDCCH) for scheduling aperiodic CSI reporting and the time slot offset.

In some embodiments, semi-persistent reporting needs to provide the number of reported time slots and time slot positions.

The identifier of the reference signal to be measured may include an identifier of the first reference signal, and/or an identifier of the second reference signal.

The report parameters may include one or more of: rank index (RI), precoding matrix index (PMI), CQI, CSI-RS resource indicator (CRI), reference signal receiving power (RSRP), or SSB-index-RSRP.

The report bandwidth configuration includes subband or wideband. When the report bandwidth configuration is subband, the report bandwidth configuration also carries the frequency domain position of the subband and/or the size of the subband.

The UE reports the code words corresponding to the CQI value of the serving cell according to the CQI table, and reports the offset between the CQI values of the neighbor cell and the CQI value of the serving cell. The CQI table includes the correspondence between CQI value ranges and code words.

In some embodiments, as illustrated in FIG. 3, the method further includes the following step.

In S12, the network device of the serving cell of the UE receives a measurement result of the channel state information of the neighbor cell measured and reported by the UE based on the measurement configuration information.

For example, the network device of the serving cell of the UE transmits the measurement configuration information to the UE, and the UE measures the channel state information of the transmission channel between the UE and the neighbor cell based on the measurement configuration information, and reports the measurement result of the channel state information of the transmission channel between the UE and the neighbor cell to the network device of the serving cell of the UE. In one scenario, the UE directly reports the beam-transmission-based channel state information measurement result of the neighbor cell to the network device of the serving cell. In another scenario, the UE jointly reports the measurement result and the measurement result of channel state information of the network device of the serving cell to the network device of the serving cell. The joint reporting manner will be given in the following embodiments, which will not be repeated herein. The reporting manner of the UE may be determined according to a specific scenario, which is not limited herein.

In some embodiments, the UE only reports the measurement result to the network device of the serving cell, that is, the UE does not report the measurement result to the network device of the neighbor cell. At this time, the network device of the serving cell needs to forward the measurement result to the network device of the neighbor cell. As illustrated in FIG. 3, the method may further include the following step.

In S13, the network device of the serving cell of the UE forwards the measurement result of the channel state information to the network device of the neighbor cell of the UE.

In this way, the network device of the serving cell of the UE forwards the measurement result of the channel state information of the neighbor cell to the network device of the neighbor cell of the UE, so that the network device of the neighbor cell can know the measurement result of the channel state information, which is convenient for the network device of the neighbor cell to schedule resources for the UE according to the measurement result of the channel state information, so as to improve the throughput of the UE.

Figure 4:
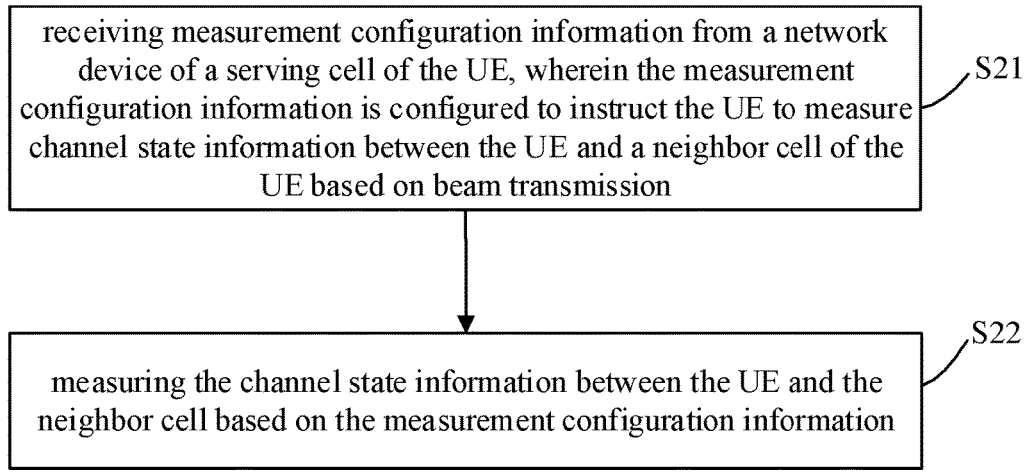
FIG. 4 is flowchart of a method for measuring channel state information in a user equipment, according to some embodiments.

Embodiments of the disclosure show a method for measuring channel state information. As illustrated in FIG. 4, the method for measuring channel state information is applicable to a UE. The method includes the following steps.

In S21, measurement configuration information transmitted by a network device of a serving cell of the UE is received, in which the measurement configuration information is configured to instruct the UE to measure channel state information between the UE and a neighbor cell of the UE based on beam transmission.

In S22, the channel state information between the UE and the neighbor cell is measured based on the measurement configuration information.

In the technical solution in the disclosure, the UE receives the measurement indication information from the network device of the serving cell of the UE and configured to instruct the UE to measure the channel state information between the UE and the network device of the neighbor cell of the UE based on beam transmission. Based on the measurement configuration information, the channel state information measurement of the transmission channel between the UE and the network device of the neighbor cell is performed. In this way, since the measurement result of the channel state information of the neighbor cell can be determined, and when the multiple TRPs or panels of the serving cell and the neighbor cell transmit data to the UE at the same time, the multiple panels of multiple cells can dynamically switch beams to transmit data to the UE, so that the communication between the neighbor cell and the UE can also achieve the better effect and improve the throughput and user experience.

In some embodiments, the measurement configuration information of the neighbor cell includes one or more of: physical cell identification information of the neighbor cell; frequency domain information of the neighbor cell; or measurement configuration sub-information of the neighbor cell.

The physical cell identification information may include identification information such as a PCI.

The frequency domain information may include a frequency point and a bandwidth located by a carrier or a BWP.

In some embodiments, the measurement configuration sub-information of the neighbor cell includes one or more of: first resource indication information of a first reference signal for channel state information signal quality measurement; second resource indication information of a second reference signal for CSI-IM; or measurement result report configuration information of the channel state information.

In some embodiments, the first reference signal includes a SSB or a CSI-RS transmitted by the network devices of the neighbor cell.

The CSI-RS includes a NZP-CSI-RS or a ZP-CSI-RS.

In some embodiments, the first resource indication information includes one or more of: an identifier of the first reference signal; time domain location information of the first reference signal; frequency domain location information of the first reference signal; or beam direction information of the first reference signal.

The beam direction of the first reference signal may be indicated by a TCI state or space relation information.

The reference signal indicated by the TCI state or the space relation information is the SSB or CSI-RS transmitted by the network device of the neighbor cell through the neighbor cell, or an SRS transmitted by the terminal.

The network device of the neighbor cell may also correspond to other neighbor cells in addition to this neighbor cell. For example, the neighbor cells corresponding to the network device include a first neighbor cell, a second neighbor cell and a third neighbor cell, and when the neighbor cell of the UE is the first neighbor cell, the reference signal indicated by the TCI state or the space relation information is the SSB or CSI-RS transmitted by the network device of the first neighbor cell through the first neighbor cell, but not the SSB or CSI-RS transmitted by the network device of the first neighbor cell through the second neighbor cell or the third neighbor cell.

In some embodiments, the second reference signal includes an SSB or a CSI-RS transmitted by the network device of the neighbor cell through the neighbor cell; and the second resource indication information includes one or more of: an identifier of the second reference signal; time domain location information of the second reference signal; frequency domain location information of the second reference signal; or beam direction information of the second reference signal.

The beam direction of the second reference signal may be indicated by a TCI state or space relation information.

The reference signal indicated by the TCI state or the space relation information is the SSB or CSI-RS transmitted by the network device of the neighbor cell through the neighbor cell, or an SRS transmitted by the UE.

In some embodiments, the measurement result report configuration information includes one or more of: a cell index; a report type; an identifier of a reference signal to be measured; report parameters; report bandwidth configuration information; or a CQI.

The cell index may be a PCI, or a number assigned to this cell, which is configured to distinguish it from one or more other cells that provide transmission services for the UE, for example, there are 3 cells provide services for the UE, the three cell numbers may be #0, #1 and #2 respectively.

The report type is divided into periodic reporting, aperiodic reporting, or semi-persistent reporting.

In some embodiments, periodic reporting needs to give a period and a time slot offset.

In some embodiments, aperiodic reporting needs to provide a time slot offset, for example, a time slot position for reporting the CSI is obtained according to a time slot position of a PDCCH for scheduling aperiodic CSI reporting and the time slot offset.

In some embodiments, semi-persistent reporting needs to provide the number of reported time slots and time slot positions.

The identifier of the reference signal to be measured may include an identifier of the first reference signal, and/or an identifier of the second reference signal.

The report parameters may include one or more of: RI, PMI, CQI, CRI, RSRP, or SSB-index-RSRP.

The report bandwidth configuration includes subband or wideband. When the report bandwidth configuration is subband, the report bandwidth configuration also carries the frequency domain position of the subband and/or the size of the subband.

In some embodiments, a specific manner for the UE to measure the channel state information based on beam transmission between the UE and the neighbor cell based on the measurement configuration information is similar to the manner in the related art, which is not specifically limited in some embodiments.

Figure 5:
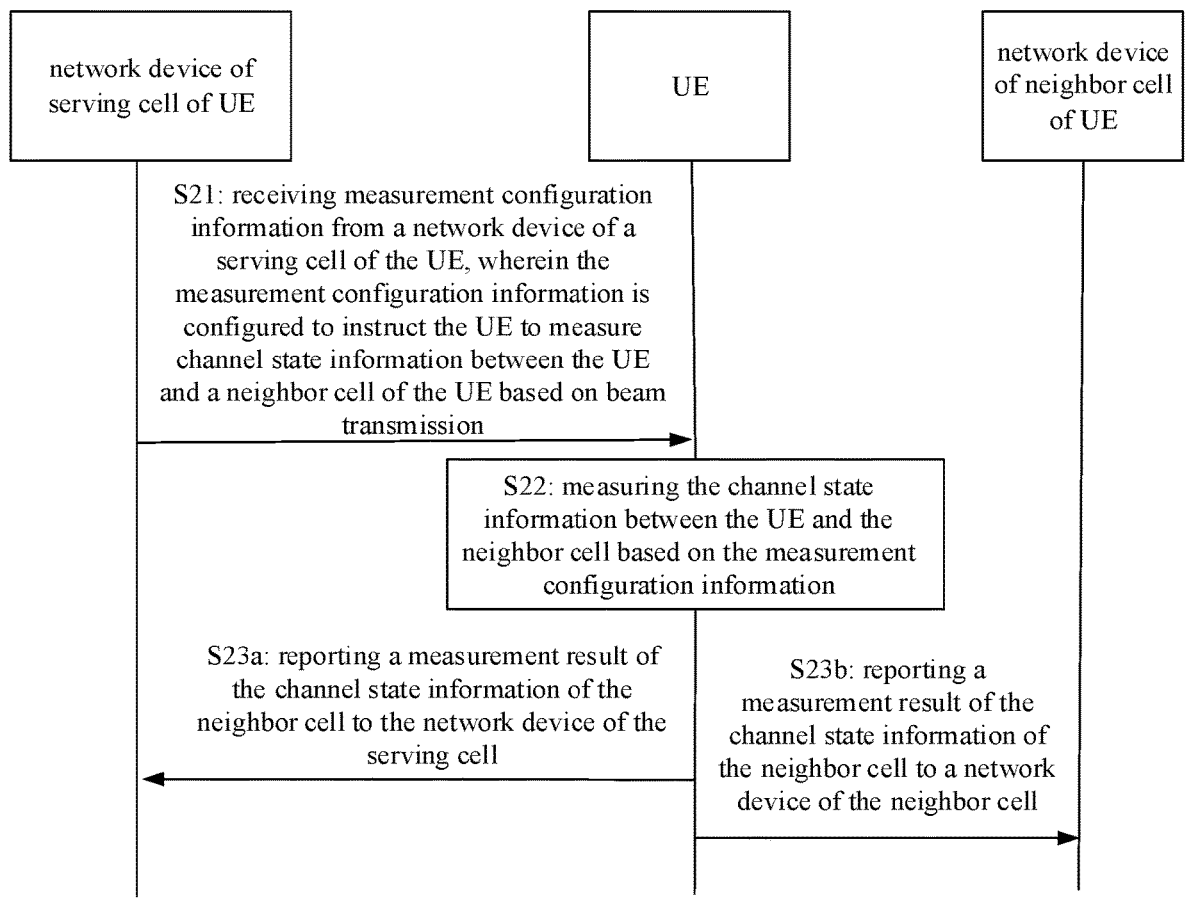
FIG. 5 is flowchart of device interaction according to some embodiments.

In some embodiments, after the UE obtains the measurement result, it needs to transmit the result to the network device of the neighbor cell, so that beam switching can be implemented between the network device of the neighbor cell and the UE according to the measurement result. As illustrated in FIG. 5, the method also includes the following steps.

In S23a: the UE reports a measurement result of the channel state information of the neighbor cell to the network device of the serving cell of the UE; and/or, in S23b: the UE reports a measurement result of the channel state information of the neighbor cell to the network device of the neighbor cell of the UE.

It should be noted that, when the method includes step S23a and step S23b, step S23a may be performed first, or step S23b may be performed first, or step S23a and step S23b may be performed simultaneously, and the order of reporting is not specifically limited herein, and reporting can be implemented according to different scenarios.

In some embodiments, reporting the measurement result of the channel state information of the neighbor cell includes: reporting the measurement result of the channel state information of the neighbor cell and a measurement result of channel state information of the serving cell jointly; or reporting the measurement result of the channel state information of the neighbor cell and a measurement result of channel state information of the serving cell respectively.

The measurement result of the channel state information of the serving cell includes a measurement result of the channel state information between the UE and the serving cell that is measured based on beam transmission.

In this way, it is convenient for the network device of the neighbor cell to schedule resources for the UE according to the measurement result of the channel state information, so as to improve the throughput of the UE.

In some embodiments, reporting the measurement result of the channel state information of the neighbor cell and the measurement result of the channel state information of the serving cell jointly includes: reporting, based on a CQI table, code words corresponding to a CQI value of the serving cell, and an offset between a CQI value of the neighbor cell and the CQI value of the serving cell.

For example, the CQI value of the serving cell is reported by the code words according to the CQI table, and the CQI value of the neighbor cell can be reported by the offset between the CQI value of the neighbor cell and the CQI value of the serving cell, thereby reducing the number of bits.

In some embodiments, reporting the measurement result of the channel state information of the neighbor cell and the measurement result of the channel state information of the serving cell jointly includes: obtaining a calculated measurement result by calculating the measurement result of the channel state information of the neighbor cell and the measurement result of the channel state information of the serving cell; and reporting the calculated measurement result.

The measurement result obtained after the calculation processing includes one or more items of measurement result report configuration information.

In some embodiments of the disclosure, the measurement result obtained after the calculation processing may be a set of measurement results, and the calculation manner includes but is not limited to obtaining an average value or a weighted average value. The embodiments of the disclosure do not limit the calculation manner for obtaining a set of measurement results.

In some embodiments of the disclosure, a set of measurement results is reported only to the network device of the neighbor cell of the UE, or only to the network device of the serving cell, or to the network device of the neighbor cell of the UE and the network device of the serving cell respectively.

In the technical solution of the disclosure, the UE receives the measurement indication information that is transmitted by the network device of the serving cell of the UE and configured to instruct the UE to measure the channel state information between the UE and the network device of the neighbor cell of the UE based on beam transmission. Based on the measurement configuration information, the channel state information measurement of the transmission channel between the UE and the network device of the neighbor cell is performed. In this way, since the measurement result of the channel state information of the neighbor cell can be determined, and when the multiple TRPs or panels of the serving cell and the neighbor cell transmit data to the UE at the same time, the multiple panels of multiple cells can dynamically switch beams to transmit data to the UE, so that the communication between the neighbor cell and the UE can also achieve the better effect and improve the throughput and user experience.

Figures 6, 7:
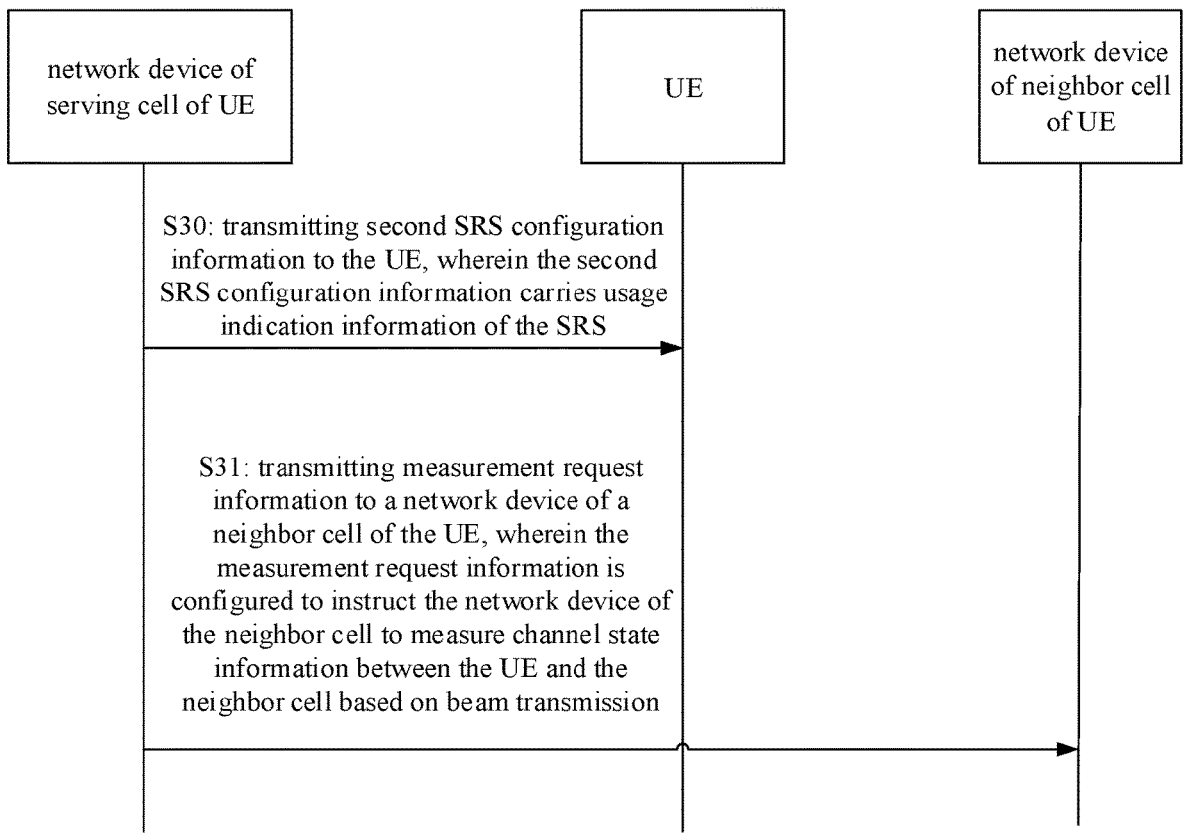
FIG. 6 is flowchart of a method for measuring channel state information in a network device of a serving cell of a user equipment, according to some embodiments.
FIG. 7 is flowchart of device interaction according to some embodiments.

Embodiments of the disclosure show a method for measuring channel state information. As illustrated in FIG. 6, the method for measuring channel state information is applicable to a network device of a serving cell of a UE, such as a base station of the serving cell. The method includes the following step.

In S31, measurement request information is transmitted to a network device of a neighbor cell of the UE, in which the measurement request information is configured to instruct the network device of the neighbor cell to measure channel state information between the UE and the neighbor cell based on beam transmission.

In some embodiments, the measurement request information includes first SRS configuration information for measuring channel state information by the network device of the neighbor cell, in which the first SRS configuration information is configured to indicate an SRS to be measured.

For example, the network device of the serving cell of the UE transmits the measurement request information to the network device of the neighbor cell of the UE, and the network device of the neighbor cell measures the channel state information of the transmission channel between the neighbor cell and the UE based on the measurement request information.

In this way, the network device of the neighbor cell obtain the measurement result of the channel state information by itself, so that the network device of the neighbor cell can schedule resources for the UE according to the measurement result of the channel state information, so as to improve the throughput of the UE.

In some embodiments, the first SRS configuration information includes one or more of: an identifier of the UE; an identifier of the SRS; a time domain position of the SRS; a frequency domain position of the SRS; type information of the SRS; beam direction information of the SRS; or port index information of the SRS.

The time domain position of the SRS may include one or more of: a start symbol position, a number of symbols, and a repetition factor.

The frequency domain position of the SRS may include one or more of: a frequency domain position, a frequency domain offset, and a frequency hopping parameter.

The type of the SRS includes periodic, aperiodic, and semi-persistent.

In some embodiments, the beam direction information of the SRS may be indicated by a TCI state or space relation information.

The reference signal indicated by the TCI state or the space relation information includes an SSB or CSI-RS transmitted by the network device of the neighbor cell through the neighbor cell, or an SRS transmitted by the UE.

The network device of the neighbor cell may also correspond to other neighbor cells in addition to this neighbor cell. For example, the neighbor cells corresponding to the network device include a first neighbor cell, a second neighbor cell and a third neighbor cell, and when the neighbor cell of the UE is the first neighbor cell, the reference signal indicated by the TCI state or the space relation information is the SSB or CSI-RS transmitted by the network device of the first neighbor cell through the first neighbor cell, but not the SSB or CSI-RS transmitted by the network device of the first neighbor cell through the second neighbor cell or the third neighbor cell.

In some embodiments, the SRS is an SRS transmitted by the UE.

The SRS may be the SRS that the UE has already transmitted. For example, the SRS is transmitted by the UE and used for beam measurement of the serving cell, or used for channel state information measurement of the serving cell, or used for beam measurement for the neighbor cell and other purposes. That is, the SRS used for channel state information measurement of the neighbor cell can be multiplexed with the SRS used for other purposes, so that the UE does not need to transmit the additional SRS, and the network device of the serving cell does not need to configure the UE to transmit a specified SRS for the channel state information measurement of the neighbor cell, thereby saving the signaling overhead.

In some embodiments, the UE transmits the specified SRS used for the channel state information measurement of the neighbor cell, and the network device of the serving cell of the UE needs to configure the configuration information for instructing the UE to transmit the SRS. As illustrated in FIG. 7, the method further includes the following step.

In S30, the network device of the serving cell of the UE transmits second SRS configuration information to the UE, in which the second SRS configuration information carries usage indication information of the SRS.

The usage indication information includes: beam management information, codebook information, non-codebook information, or antenna switching information.

The usage indication information being the codebook information means that the SRS is used for codebook-based CSI measurement.

The usage indication information being the non-codebook information means that the SRS is used for non-codebook-based CSI measurement.

In some embodiments, the usage indication information also carries an identifier of a neighbor cell applicable for the SRS. The identifier of the neighbor cell may be the PCI of the neighbor cell, or may be a cell number of the neighbor cell at the UE side, to distinguish it from other cells that provide transmission services for the UE.

In this way, it is convenient for the UE to transmit, based on the second SRS configuration information, the SRS for the network device of the neighbor cell to perform the channel state information measurement of the transmission channel between the neighbor cell and the UE.

In the technical solution of the disclosure, the network device of the serving cell of the UE transmits the measurement indication information to the network device of the neighbor cell of the UE, in which the measurement indication information is configured to instruct the network device of the neighbor cell to perform channel state information measurement of the transmission channel between the neighbor cell and the UE. Since the measurement result of the channel state information of the neighbor cell can be obtained, and when the multiple TRPs or panels of the serving cell and the neighbor cell transmit data to the UE at the same time, the multiple TRPs or panels of the multiple cells can dynamically switch beams to transmit data to the UE, so that the communication between the neighbor cell and the UE can also achieve the better effect, thereby improving the throughput and user experience.

Figure 8:
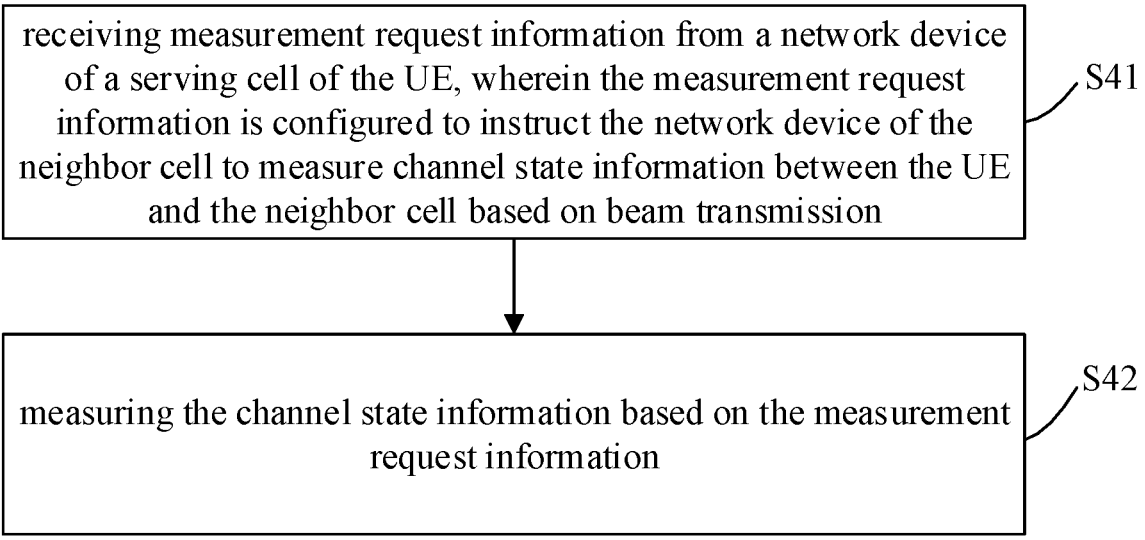
FIG. 8 is flowchart of a method for measuring channel state information in a network device of a neighbor cell of a user equipment, according to some embodiments.

Embodiments of the disclosure show a method for measuring channel state information. As illustrated in FIG. 8, the method for measuring channel state information is applicable to a network device of a neighbor cell of a UE, such as a base station of the neighbor cell of the UE. The method includes the following steps.

In S41, measurement request information from a network device of a serving cell of the UE is received, in which the measurement request information is configured to instruct the network device of the neighbor cell to measure channel state information between the UE and the neighbor cell based on beam transmission.

In S42, the channel information is measured based on the measurement request information.

In the technical solution of the disclosure, the network device of the neighbor cell of the UE receives the measurement request information transmitted by the network device of the serving cell of the UE. Based on the measurement request information, the network device of the neighbor cell performs the channel state information measurement between the UE and the neighbor cell based on beam transmission. In this way, since the measurement result of the channel state information of the neighbor cell can be determined, and when the multiple TRPs or panels of the serving cell and the neighbor cell transmit data to the UE at the same time, the multiple panels of multiple cells can dynamically switch beams to transmit data to the UE, so that the communication between the neighbor cell and the UE can also achieve the better effect and improve the throughput and user experience.

In some embodiments, the measurement request information includes first SRS configuration information, in which the first SRS configuration information is configured to indicate an SRS transmitted by the UE to the network device of the neighbor cell.

In some embodiments, the first SRS configuration information includes one or more of: an identifier of the UE; an identifier of the SRS; resource location information of the SRS; type information of the SRS; beam direction information of the SRS; or port index information of the SRS.

In some embodiments, the beam direction information of the SRS may be indicated by a TCI state or space relation information.

The reference signal indicated by the TCI state or the space relation information includes an SSB or CSI-RS transmitted by the network device of the neighbor cell through the neighbor cell, or an SRS transmitted by the UE.

The network device of the neighbor cell may also correspond to other neighbor cells in addition to this neighbor cell. For example, the neighbor cells corresponding to the network device include a first neighbor cell, a second neighbor cell and a third neighbor cell, and when the neighbor cell of the UE is the first neighbor cell, the reference signal indicated by the TCI state or the space relation information is the SSB or CSI-RS transmitted by the network device of the first neighbor cell through the first neighbor cell, but not the SSB or CSI-RS transmitted by the network device of the first neighbor cell through the second neighbor cell or the third neighbor cell.

In some embodiments, the method further includes: measuring an SRS transmitted by the UE. Measuring the channel state information based on the measurement request information includes: measuring the channel state information on a transmission channel between the network device of the neighbor cell and the UE based on the SRS.

In some embodiments, the SRS may be the SRS that the UE has already transmitted. For example, the SRS is transmitted by the UE and used for beam measurement of the serving cell, or used for channel state information measurement of the serving cell, or used for beam measurement for the neighbor cell and other purposes. That is, the SRS used for channel state information measurement of the neighbor cell can be multiplexed with the SRS used for other purposes, so that the UE does not need to transmit the additional SRS, and the network device of the serving cell does not need to configure the UE to transmit a specified SRS for the channel state information measurement of the neighbor cell, thereby saving the signaling overhead.

Figure 9:
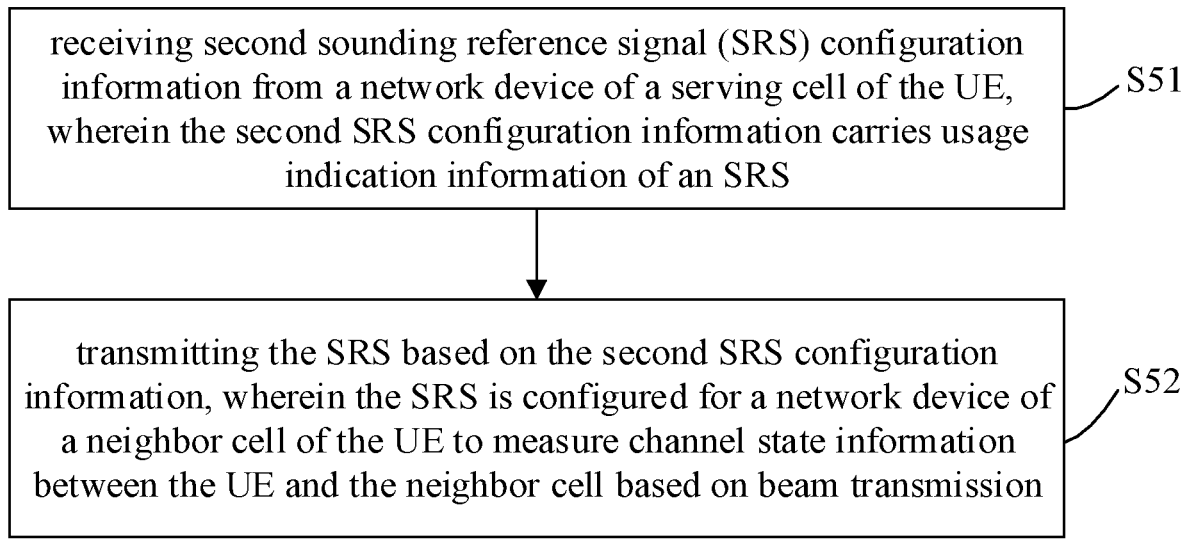
FIG. 9 is flowchart of a method for measuring channel state information in a user equipment, according to some embodiments.

In some embodiments, the SRS may be an SRS transmitted by the UE and dedicated for the channel state information measurement of neighbor cell. In this case, the UE needs to transmit the SRS according to the configuration information transmitted by the network device of the serving cell of the UE. Embodiment shows a method for measuring channel state information. As illustrated in FIG. 9, the method for measuring channel state information is applicable to a UE. The method includes the following steps.

In S51, the UE receives second SRS configuration information from a network device of a serving cell of the UE, in which the second SRS configuration information carries usage indication information of an SRS.

In S52, the UE transmits the SRS based on the second SRS configuration information, in which the SRS is configured for a network device of a neighbor cell of the UE to measure channel state information between the UE and the neighbor cell based on beam transmission.

In some embodiments, the usage indication information includes: beam management information, codebook information, non-codebook information, or antenna switching information.

In some embodiments, the usage indication information carries an identifier of a neighbor cell applicable for the SRS.

In this way, the UE can transmit the SRS based on the second SRS configuration information, and the network device of the neighbor cell of the UE can perform the channel state information measurement on the transmission channel between the network device of the neighbor cell and the UE according to the SRS transmitted by the UE, so that the network device of the neighbor cell can schedule resources for the UE according to the measurement result of the channel state information, so as to improve the throughput of the UE.

Figure 10:
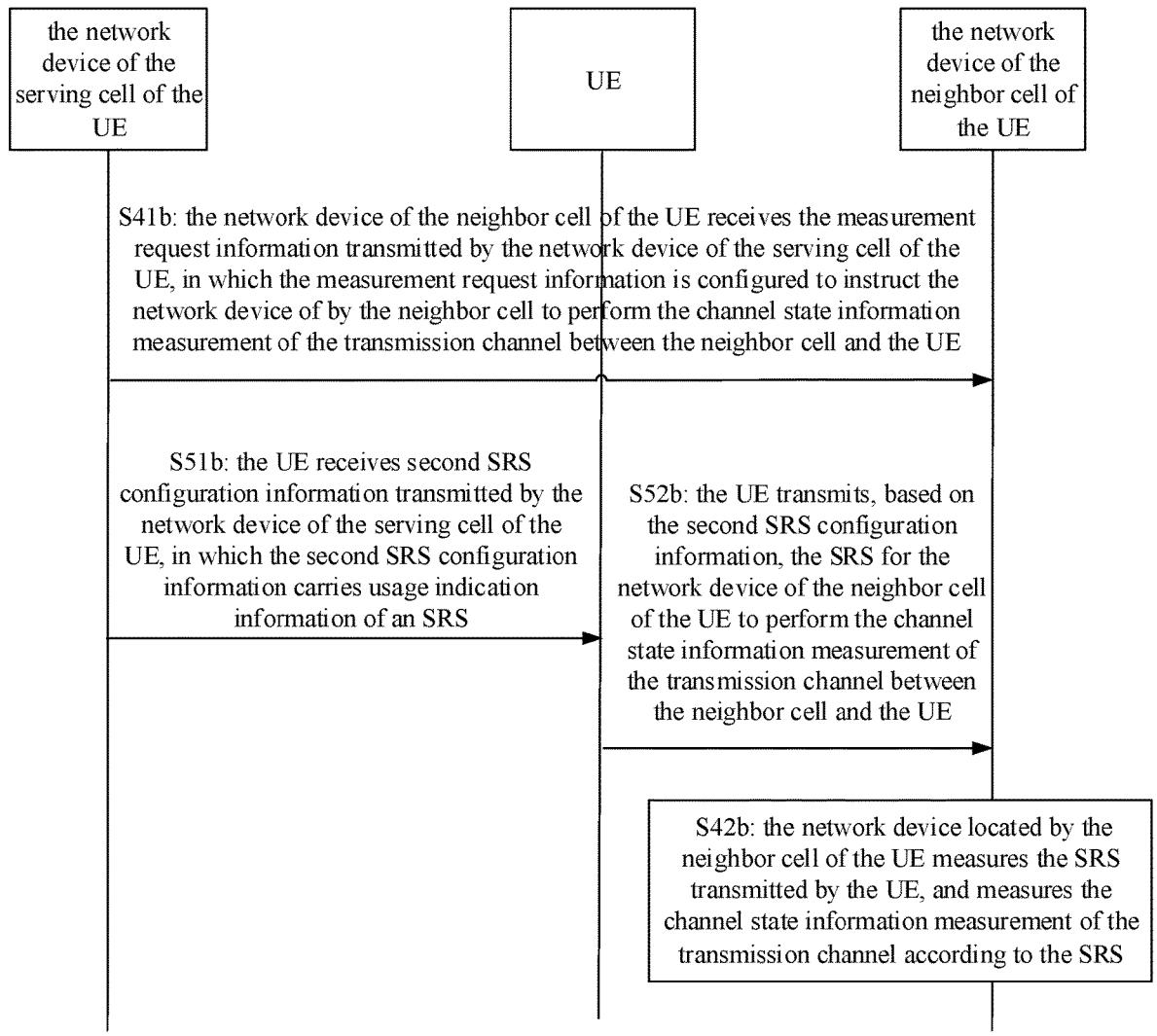
FIG. 10 is flowchart of interactions between a serving cell, a neighbor cell and a user equipment, according to some embodiments.

FIG. 10 is flowchart 4 of device interaction. As illustrated in FIG. 10, the process includes the following steps.

In S41*b*: the network device of the neighbor cell of the UE receives the measurement request information transmitted by the network device of the serving cell of the UE, in which the measurement request information is configured to instruct the network device of the neighbor cell to perform the channel state information measurement of the transmission channel between the neighbor cell and the UE.

In S51*b*: the UE receives second SRS configuration information transmitted by the network device of the serving cell of the UE, in which the second SRS configuration information carries usage indication information of an SRS.

The usage indication information is configured to instruct the UE to transmit the SRS for channel state information measurement of the neighbor cell.

In S52*b*: the UE transmits, based on the second SRS configuration information, the SRS for the network device of the neighbor cell of the UE to perform the channel state information measurement of the transmission channel between the neighbor cell and the UE.

In S42*b*: the network device of the neighbor cell of the UE measures the SRS transmitted by the UE, and measures the channel state information measurement of the transmission channel according to the SRS.

It should be noted that the disclosure does not limit the execution order of step S41*b* and step S51*b*. In practical applications, step S41*b* and step S51*b* can be performed simultaneously, step S41*b* can also be performed before step S51*b*, or step S41*b* can also be performed after step S51*b*.

In this way, the network device of the neighbor cell of the UE can perform the channel state information measurement of the transmission channel between the neighbor cell and the UE according to the SRS transmitted by the UE based on the second SRS configuration information. Since the channel state information between the UE and the neighbor cell of the UE based on beam transmission can be obtained, the multiple panels of multiple cells transmit data to the UE at the same time, and the beams can be dynamically switched to transmit data to the UE, so that the communication between the neighbor cell and the UE can also achieve the better result, thereby improving the throughput of the UE.

It should be noted that the applicable scenarios of the technical solutions described in the disclosure may include, but are not limited to, the application scenarios exemplified above. The technical solutions described in the disclosure can also be applicable to other scenarios, for example, the device performing channel state information measurement is a vehicle-mounted device or a speaker device, and the disclosure does not specifically limit application scenarios.

Figure 11:
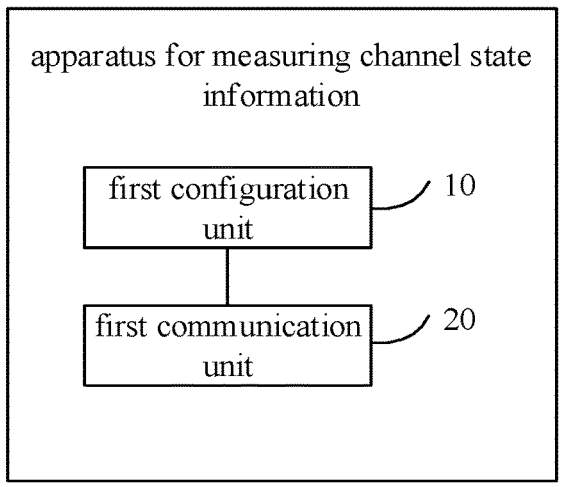
FIG. 11 is block diagram of an apparatus of a serving cell for measuring channel state information according to some embodiments.

Corresponding to the method for measuring channel state information applicable to the network device of the serving cell of the UE as illustrated in FIG. 2, embodiments of the disclosure also provide an apparatus for measuring channel state information for the network device of the serving cell of the UE. As illustrated in FIG. 11, the apparatus includes a first configuration unit 10 and a first communication unit 20.

The first configuration unit 10 is configured to configure measurement configuration information of a neighbor cell, in which the measurement configuration information is configured to instruct the UE to measure channel state information between the UE and the neighbor cell based on beam transmission.

The first communication unit 20 is configured to transmit the measurement configuration information to the UE.

In some embodiments, the first communication unit 20 is further configured to receive a measurement result of the channel state information of the transmission channel between the UE and the neighbor cell measured and reported by the UE based on the measurement configuration information.

In some embodiments, the first communication unit 20 is further configured to forwarding the measurement result of the channel state information to a network device of the neighbor cell.

Regarding the apparatus in the above embodiments, the specific manner in which each module performs operations has been described in detail in embodiments of the method, and will not be described in detail herein.

In practical applications, the specific structures of the first configuration unit 10 and the first communication unit 20 can be determined by the apparatus for measuring channel state information or a central processing unit (CPU), a micro controller unit (MCU), a digital signal processing (DSP) or a programmable logic controller (PLC) in the apparatus for measuring channel state information.

Those skilled in the art should understand that the functions of each processing module in the apparatus for measuring channel state information of embodiments of the disclosure can be understood by referring to the relevant description of the method for measuring channel state information in FIG. 2. Each processing module in the apparatus may be implemented by an analog circuit that implements the function described in embodiments of the disclosure, or may be implemented by running software on the apparatus that executes the function described in embodiments of the disclosure.

The apparatus for measuring channel state information according to embodiments of the disclosure can instruct the UE to obtain the measurement result of the channel state information of the neighbor cell.

Figure 12:
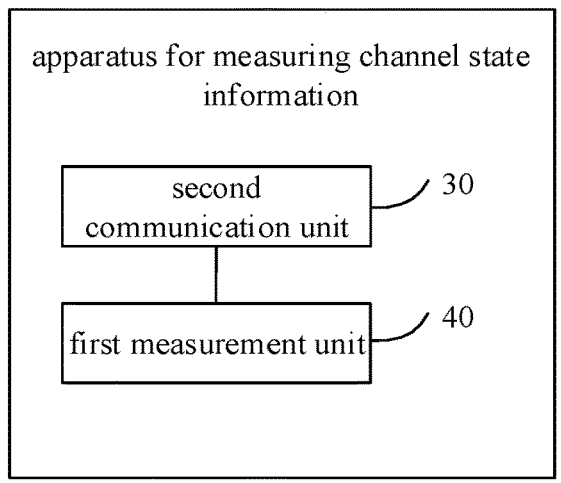
FIG. 12 is block diagram of an apparatus of a user equipment for measuring channel state information according to some embodiments.

Corresponding to the method for measuring channel state information applicable to the UE as illustrated in FIG. 4, embodiments of the disclosure further provide an apparatus for measuring channel state information for the UE. As illustrated in FIG. 12, the apparatus includes a second communication unit 30 and a first measurement unit 40.

The second communication unit 30 is configured to receive measurement configuration information from a network device of a serving cell of the UE, in which the measurement configuration information is configured to instruct the UE to measure channel state information between the UE and a neighbor cell of the UE based on beam transmission.

The first measurement unit 40 is configured to measure the channel state information between the UE and the neighbor cell based on the measurement configuration information.

In some embodiments, the second communication unit 30 is further configured to report a measurement result of the channel state information of the neighbor cell to the network device of the serving cell and/or a network device of the neighbor cell.

In some embodiments, the second communication unit 30 is further configured to report the measurement result of the channel state information of the neighbor cell and a measurement result of channel state information of the serving cell jointly, to the network device of the serving cell and/or the network device of the neighbor cell; or, report the measurement result of the channel state information of the neighbor cell and a measurement result of channel state information of the serving cell respectively, to the network device of the serving cell and/or the network device of the neighbor cell.

The measurement result of the channel state information of the serving cell includes a measurement result of channel state information between the UE and the serving cell that is measured based on beam transmission.

In some embodiments, the second communication unit 30 is further configured to: report, based on a channel quality index (CQI) table, code words corresponding to a CQI value of the serving cell, and an offset between a CQI value of the neighbor cell and the CQI value of the serving cell.

In some embodiments, the second communication unit 30 is further configured to: obtain a calculated measurement result by calculating the measurement result of the channel state information of the neighbor cell and the measurement result of the channel state information of the serving cell; and report the calculated measurement result.

Regarding the apparatus in the above embodiments, the specific manner in which each module performs operations has been described in detail in embodiments of the method, and will not be described in detail herein.

In practical applications, the specific structures of the second communication unit 30 and the first measurement unit 40 can be implemented by the apparatus for measuring channel state information or a CPU, MCU, DSP or PLC in the apparatus for measuring channel state information.

Those skilled in the art should understand that the functions of each processing module in the apparatus for measuring channel state information of embodiments of the disclosure can be understood by referring to the relevant description of the method for measuring channel state information in FIG. 4. Each processing module in the apparatus may be implemented by an analog circuit that implements the function described in embodiments of the disclosure, or may be implemented by running software on the apparatus that executes the function described in embodiments of the disclosure.

The apparatus for measuring channel state information according to embodiments of the disclosure can obtain the measurement result of the channel state information of the neighbor cell.

Figure 13:
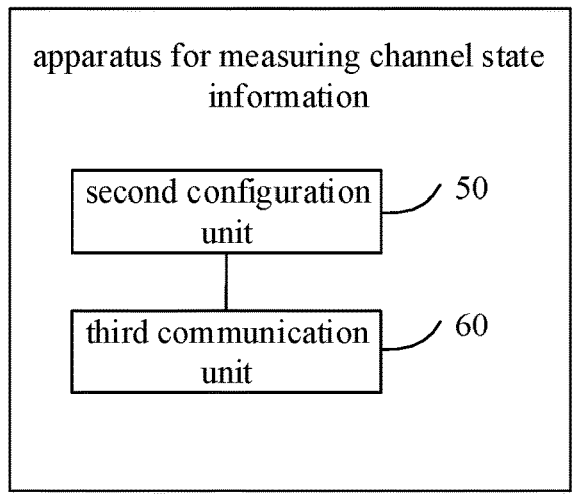
FIG. 13 is block diagram of an apparatus of a serving cell for measuring channel state information according to some embodiments.

Corresponding to the method for measuring channel state information applicable to the network device of the serving cell of the UE as illustrated in FIG. 6, embodiments of the disclosure also provide an apparatus for measuring channel state information for the network device of the serving cell of the UE. As illustrated in FIG. 13, the apparatus includes a second configuration unit 50 and a third communication unit 60.

The second configuration unit 50 is configured to: configure measurement request information, in which the measurement request information is configured to instruct a network device of a neighbor cell to measure channel state information between the UE and the neighbor cell based on beam transmission.

The third communication unit 60 is configured to transmit the measurement request information to the network device of the neighbor cell.

In some embodiments, the measurement request information includes first SRS configuration information, in which the first SRS configuration information is configured to indicate an SRS transmitted by the UE to the network device of the neighbor cell.

In some embodiments, the third communication unit 60 is further configured to: transmit second SRS configuration information to the UE, so that the UE transmits the SRS based on the second SRS configuration information.

Regarding the apparatus in the above embodiments, the specific manner in which each module performs operations has been described in detail in embodiments of the method, and will not be described in detail herein.

In practical applications, the specific structures of the second configuration unit 50 and the third communication unit 60 can be implemented by the apparatus for measuring channel state information or a CPU, MCU, DSP or PLC in the apparatus for measuring channel state information.

Those skilled in the art should understand that the functions of each processing module in the apparatus for measuring channel state information of embodiments of the disclosure can be understood by referring to the relevant description of the method for measuring channel state information in FIG. 6. Each processing module in the measurement apparatus may be implemented by an analog circuit that implements the function described in embodiments of the disclosure, or may be implemented by running software on the apparatus that executes the function described in embodiments of the disclosure.

The apparatus for measuring channel state information according to embodiments of the disclosure can instruct the network device of the neighbor cell of the UE to obtain the measurement result of the channel state information of the neighbor cell.

Figure 14:
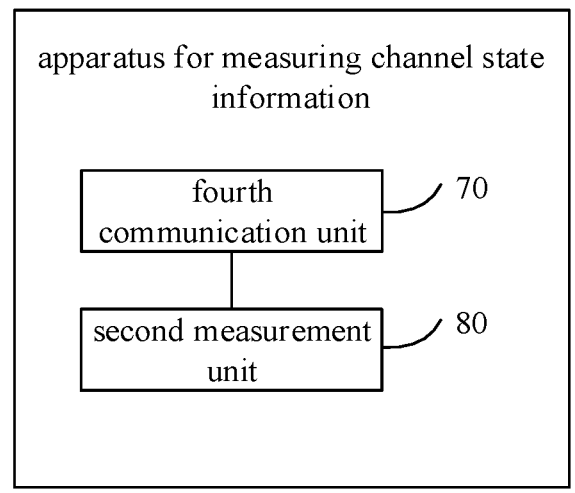
FIG. 14 is block diagram of an apparatus of a neighbor cell for measuring channel state information according to some embodiments.

Corresponding to the method for measuring channel state information applicable to a network device of the neighbor cell of the UE as illustrated in FIG. 8, embodiments of the disclosure also provide an apparatus for measuring channel state information for the network device of the neighbor cell of the UE. As illustrated in FIG. 14. The apparatus includes a fourth communication unit 70 and a second measurement unit 80.

The fourth communication unit 70 is configured to: receive measurement request information from a network device of a serving cell of the UE, in which the measurement request information is configured to instruct the network device of the neighbor cell to measure channel state information between the UE and the neighbor cell based on beam transmission.

The second measurement unit 80 is configured to measure the channel state information based on the measurement request information.

In some embodiments, the measurement request information includes first SRS configuration information, and the first SRS configuration information is configured to indicate an SRS transmitted by the UE to the network device of the neighbor cell.

In some embodiments, the second measurement unit 80 is configured to measure the SRS transmitted by the UE.

Regarding the apparatus in the above embodiments, the specific manner in which each module performs operations has been described in detail in embodiments of the method, and will not be described in detail herein.

In practical applications, the specific structures of the fourth communication unit 70 and the second measurement unit 80 can be implemented by the apparatus for measuring channel state information or a CPU, MCU, DSP or PLC in the apparatus for measuring channel state information.

Those skilled in the art should understand that the functions of each processing module in the apparatus for measuring channel state information of embodiments of the disclosure can be understood by referring to the relevant description of the method for measuring channel state information in FIG. 8. Each processing module in the measurement apparatus may be implemented by an analog circuit that implements the function described in embodiments of the disclosure, or may be implemented by running software on the apparatus that executes the function described in embodiments of the disclosure.

The apparatus for measuring channel state information according to embodiments of the disclosure can obtain the measurement result of the channel state information of the neighbor cell.

Figure 15:
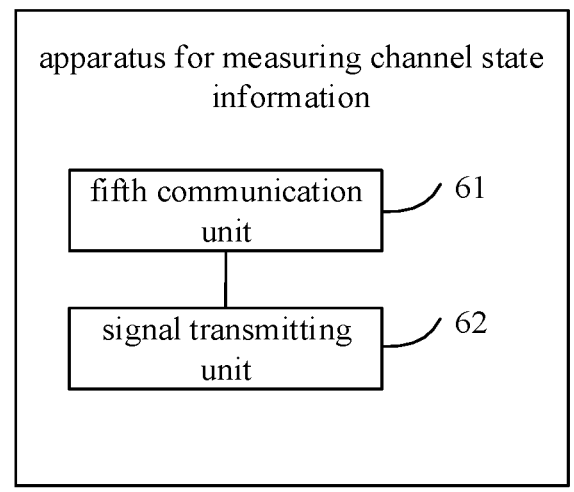
FIG. 15 is block diagram of an apparatus of a user equipment for measuring channel state information according to some embodiments.

Corresponding to the method for measuring channel state information applicable to the UE as illustrated in FIG. 9, embodiments of the disclosure also provide an apparatus for measuring channel state information for the UE. As illustrated in FIG. 15, the apparatus includes a fifth communication unit 61 and a signal transmitting unit 62.

The fifth communication unit 61 is configured to receive second SRS configuration information from a network device of a serving cell of the UE, in which the second SRS configuration information carries usage indication information of an SRS.

The signal transmitting unit 62 is configured to transmit the SRS based on the second SRS configuration information, in which the SRS is configured for a network device of a neighbor cell of the UE to measure channel state information between the UE and the neighbor cell based on beam transmission.

Regarding the apparatus in the above embodiments, the specific manner in which each module performs operations has been described in detail in embodiments of the method, and will not be described in detail herein.

In practical applications, the specific structures of the fifth communication unit 61 and the signal transmitting unit 62 can be implemented by the apparatus for measuring channel state information or a CPU, MCU, DSP or PLC in the apparatus for measuring channel state information.

Those skilled in the art should understand that the functions of each processing module in the apparatus for measuring channel state information of the embodiments of disclosure can be understood by referring to the relevant description of the method for measuring channel state information in FIG. 9. Each processing module in the measurement apparatus may be implemented by an analog circuit that implements the function described in embodiments of the disclosure, or may be implemented by running software on the apparatus that executes the function described in embodiments of the disclosure.

With the apparatus for measuring channel state information according to embodiments of the disclosure, the UE can transmit the SRS used for the channel state information measurement of the neighbor cell according to the second SRS configuration information of the network device of the serving cell.

Figure 16:
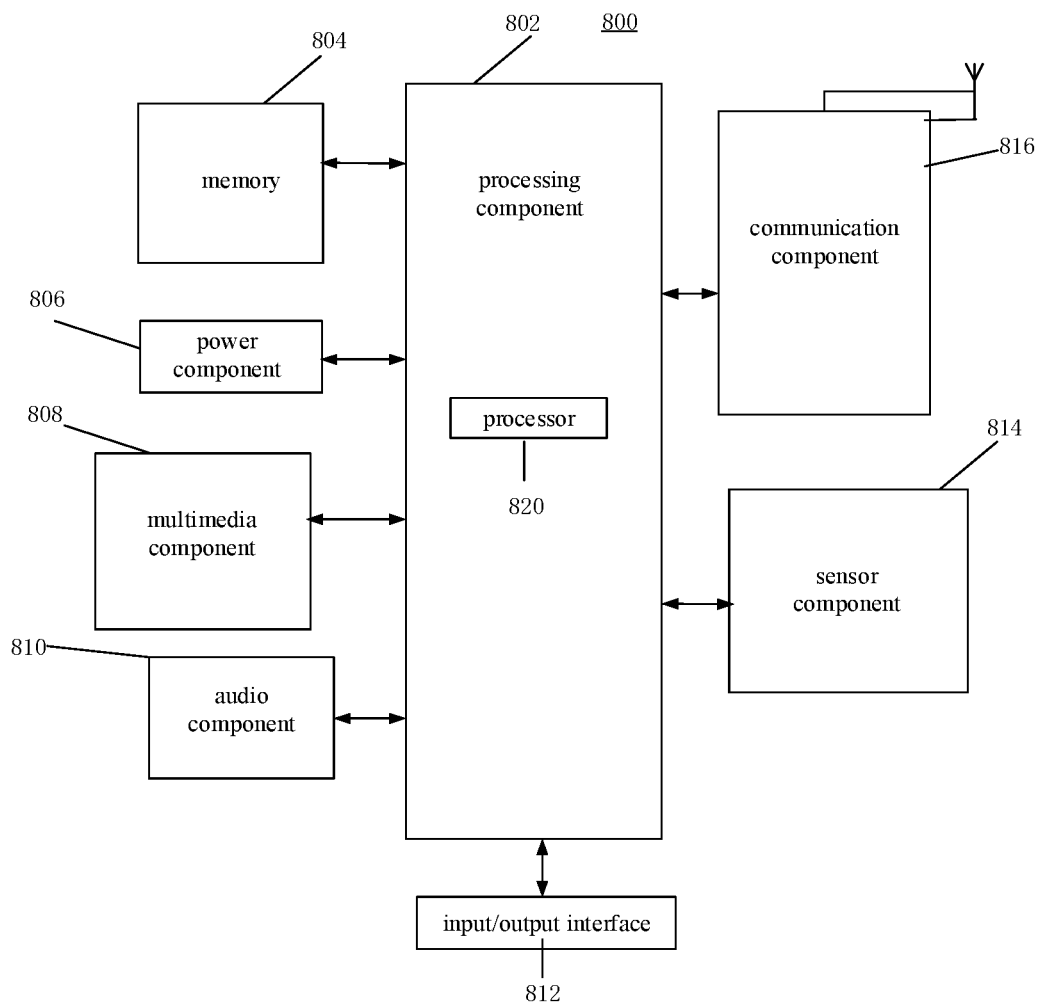
FIG. 16 is a block diagram of a device for implementing channel state information measurement according to some embodiments.

FIG. 16 is a block diagram of a device 800 for measuring channel state information according to some embodiments. For example, the device 800 may be a mobile phone, a computer, a digital broadcasting terminal, a message transceiver device, a game console, a tablet device, a medical device, a fitness device and a personal digital assistant.

As illustrated in FIG. 16, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In some embodiments, the communication component 816 receives a broadcast signal or broadcast associated information from an external broadcast management system via a broadcast channel. In some embodiments, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Blue Tooth (BT) technology, and other technologies.

In some embodiments, the device 800 may be implemented with one or more Application Specific Integrated Circuit (ASIC), Digital Signal Processor (DSP), Digital Signal Processing Device (DSPD), Programmable Logic Device (PLD), Field Programmable Gate Array (FPGA), controllers, micro-controllers, microprocessors, or other electronic components, for performing the above described method.

In some embodiments, there is also provided a non-transitory computer readable storage medium including executable instructions, such as executable instructions included in the memory 804, executable by the processor 820 in the device 800, for performing the above method. For example, non-transitory computer-readable storage medium may be a ROM, a Random Access Memory (RAM), a CD-ROM, a magnetic tape, a floppy disc, an optical data storage device, and the like.

Figure 17:
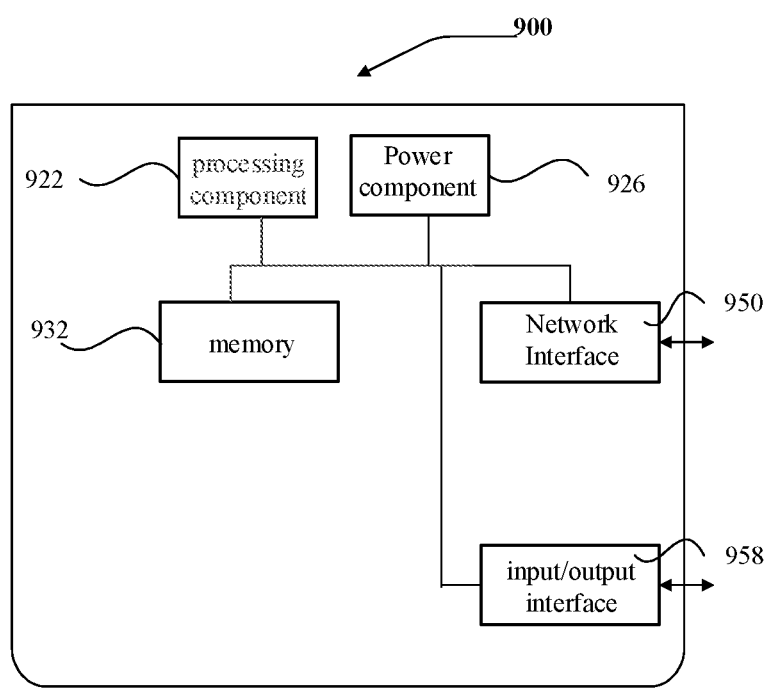
FIG. 17 is a block diagram of another device for implementing channel state information measurement according to some embodiments.

FIG. 17 is a block diagram of a device 900 for measuring channel state information according to some embodiments. For example, the device 900 may be provided as a server. As illustrated in FIG. 17, the device 900 includes a processing component 922, which includes one or more processors, and a memory resource represented by a memory 932 for storing instructions executable by the processing component 922, such as application programs. The application program stored in the memory 932 may include one or more modules, each module corresponds to a set of instructions. In addition, the processing component 922 is configured to execute instructions to perform the above method.

The device 900 may also include a power component 926 configured to perform power management of the device 900, a wired or wireless network interface 950 configured to connect the device 900 to the network, and an input/output (I/O) interface 958. The device 900 may operate based on an operating system stored on the memory 932, such as Windows Server™, Mac OS X™, Unix™, Linux™, FreeBSD™ or the like.

The technical solutions described in embodiments of the disclosure may be combined arbitrarily without conflict.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for measuring channel state information, comprising:

transmitting, by a network device of a serving cell of a user equipment (UE), measurement configuration information of a neighbor cell to the UE, wherein the measurement configuration information is configured to instruct the UE to measure channel state information between the UE and the neighbor cell based on beam transmission, and a measurement result of the channel state information is configured for a network device of the neighbor cell to determine a transmission beam with the UE when the serving cell and the neighbor cell simultaneously transmit data to the UE;

wherein the measurement configuration information comprises first resource indication information of a first reference signal for channel state information signal quality measurement; wherein the first reference signal comprises a synchronization signal block (SSB) or a channel state information reference signal (CSI-RS), transmitted by a network device of the neighbor cell, the first resource indication information comprises a transmission configuration indication (TCI) state; wherein a reference signal indicated by the TCI state comprises an SSB or CSI-RS transmitted by the network device of the neighbor cell through the neighbor cell, or a sounding reference signal (SRS) transmitted by the UE.

2. The method as claimed in claim 1, wherein the measurement configuration information further comprises at least one of:
physical cell identification information of the neighbor cell; or
frequency domain information of the neighbor cell.

3. The method as claimed in claim 1, wherein the measurement configuration information further comprises at least one of:
second resource indication information of a second reference signal for channel state information interference measurement (CSI-IM); or
measurement result report configuration information of the channel state information.

4. The method as claimed in claim 3, wherein the second reference signal comprises a synchronization signal block (SSB) or a channel state information reference signal (CSI-RS), transmitted by a network device of the neighbor cell;
the second resource indication information comprises at least one of:
an identifier of the second reference signal;
time domain location information of the second reference signal;
frequency domain location information of the second reference signal; or
beam direction information of the second reference signal.

5. The method as claimed in claim 3, wherein the measurement result report configuration information comprises at least one of:
a cell index;
a report type;
an identifier of a reference signal to be measured;
report parameters;
report bandwidth configuration information; or
a channel quality index (CQI).

6. The method as claimed in claim 1, wherein the first resource indication information further comprises at least one of:
an identifier of the first reference signal;
time domain location information of the first reference signal;
frequency domain location information of the first reference signal; or
beam direction information of the first reference signal.

7. The method as claimed in claim 6, wherein the beam direction information is indicated by the (TCI) state.

8. The method as claimed in claim 1, further comprising:
receiving a measurement result of the channel state information of the neighbor cell measured and reported by the UE based on the measurement configuration information.

9. The method as claimed in claim 8, further comprising:
forwarding the measurement result of the channel state information to a network device of the neighbor cell.

10. A method for measuring channel state information, comprising:
receiving, by a user equipment (UE), measurement configuration information from a network device of a serving cell of the UE, wherein the measurement configuration information is configured to instruct the UE to measure channel state information between the UE and a neighbor cell of the UE based on beam transmission, and a measurement result of the channel state information is configured for a network device of the neighbor cell to determine a transmission beam with the UE when the serving cell and the neighbor cell simultaneously transmit data to the UE; and
measuring, by the UE, the channel state information between the UE and the neighbor cell based on the measurement configuration information;
wherein the measurement configuration information comprises first resource indication information of a first reference signal for channel state information signal quality measurement; wherein the first reference signal comprises a synchronization signal block (SSB) or a channel state information reference signal (CSI-RS), transmitted by a network device of the neighbor cell, the first resource indication information comprises a transmission configuration indication (TCI) state; wherein a reference signal indicated by the TCI state comprises an SSB or CSI-RS transmitted by the network device of the neighbor cell through the neighbor cell, or a sounding reference signal (SRS) transmitted by the UE.

11. The method as claimed in claim 10, further comprising:
reporting, by the UE, a measurement result of the channel state information of the neighbor cell to the network device of the serving cell and/or a network device of the neighbor cell.

12. The method as claimed in claim 11, wherein reporting the measurement result of the channel state information of the neighbor cell to the network device of the serving cell and/or the network device of the neighbor cell comprises:
reporting the measurement result of the channel state information of the neighbor cell and a measurement result of channel state information of the serving cell jointly, to the network device of the serving cell and/or the network device of the neighbor cell;
or
reporting the measurement result of the channel state information of the neighbor cell and a measurement result of channel state information of the serving cell respectively, to the network device of the serving cell and/or the network device of the neighbor cell;
wherein, the measurement result of the channel state information of the serving cell comprises a measurement result of channel state information between the UE and the serving cell that is measured based on beam transmission.

13. The method as claimed in claim 12, wherein reporting the measurement result of the channel state information of the neighbor cell and the measurement result of the channel state information of the serving cell jointly comprises:
   reporting, based on a channel quality index (CQI) table, code words corresponding to a CQI value of the serving cell, and an offset between a CQI value of the neighbor cell and the CQI value of the serving cell.

14. The method as claimed in claim 12, wherein reporting the measurement result of the channel state information of the neighbor cell and the measurement result of the channel state information of the serving cell jointly comprises:
   obtaining a calculated measurement result by calculating the measurement result of the channel state information of the neighbor cell and the measurement result of the channel state information of the serving cell; and
   reporting the calculated measurement result.

15. A method for measuring channel state information, comprising:
   transmitting, by a network device of a serving cell of a user equipment (UE), measurement request information to a network device of a neighbor cell of the UE, wherein the measurement request information is configured to instruct the network device of the neighbor cell to measure channel state information between the UE and the neighbor cell based on beam transmission, and a measurement result of the channel state information is configured for the network device of the neighbor cell to determine a transmission beam with the UE when the serving cell and the neighbor cell simultaneously transmit data to the UE;
   wherein the measurement request information comprises first sounding reference signal (SRS) configuration information for measuring channel state information by the network device of the neighbor cell;
   wherein the first SRS configuration information comprises a transmission configuration indication (TCI) state;
   wherein a reference signal indicated by the TCI state comprises a synchronization signal block (SSB) or a channel state information reference signal (CSI-RS), transmitted by the network device located by the neighbor cell through the neighbor cell, or an SRS transmitted by the UE.

16. The method as claimed in claim 15, wherein the first SRS configuration information is configured to indicate an SRS to be measured, and wherein the SRS to be measured is an SRS transmitted by the UE.

17. The method as claimed in claim 16, wherein the first SRS configuration information further comprises at least one:
   an identifier of the UE;
   an identifier of the SRS to be measured;
   resource location information of the SRS to be measured;
   type information of the SRS to be measured;
   beam direction information of the SRS to be measured; or
   port index information of the SRS to be measured;
   wherein the beam direction information of the SRS to be measured is indicated by the TCI state.

18. The method as claimed in claim 16, further comprising:
   transmitting second SRS configuration information to the UE, wherein the second SRS configuration information carries usage indication information of the SRS.

19. The method as claimed in claim 15, further comprising:
   receiving, by the network device of the neighbor cell of the UE, the measurement request information; and
   measuring, by the network device of the neighbor cell of the UE, the channel state information based on the measurement request information.

* * * * *